United States Patent [19]

Stedman et al.

[11] 3,825,074

[45] July 23, 1974

[54] INTERACTING BULLDOZER STABILIZER AND EQUALIZER BAR

[75] Inventors: Robert N. Stedman, Chillicothe; Robert J. Purcell, Washington, both of Ill.

[73] Assignee: Caterpillar Tractor Co., Peoria, Ill.

[22] Filed: Dec. 21, 1972

[21] Appl. No.: 317,187

[52] U.S. Cl. .................................. 172/803, 180/9.5
[51] Int. Cl. .............................................. E02f 3/76
[58] Field of Search ........... 172/801, 803, 804, 805, 172/807, 809; 180/9.5

[56] References Cited
UNITED STATES PATENTS

| | | |
|---|---|---|
| 2,786,724 | 3/1957 | Armington ........................... 180/9.5 |
| 2,792,140 | 5/1957 | Schwartz .............................. 180/9.5 |
| 3,234,670 | 2/1966 | Fryer et al. .......................... 172/803 |
| 3,659,669 | 5/1972 | Mazzarins ............................ 180/9.5 |

*Primary Examiner*—Stephen C. Pellegrino
*Attorney, Agent, or Firm*—Phillips, Moore, Weissenberger, Lempio & Strabala

[57] ABSTRACT

A bulldozer has a brace between the blade and the main frame of the tractor upon which the blade is mounted. An equalizer bar is pivotally coupled at its midpoint to the main frame and has its ends pivotally coupled to the track frames on either side of the main frame, the track frames being pivotally fixed to the main frame.

8 Claims, 5 Drawing Figures

3,825,074

INTERACTING BULLDOZER STABILIZER AND EQUALIZER BAR

BACKGROUND OF THE INVENTION

The conventional track-type tractor has a pair of oscillatable track frames disposed on either side of the tractor main frame. Such track frames are generally supported toward the rearward ends thereof on laterally spaced bearings, which allow pivoting of the track frames in generally vertical planes. In order to adequately resist side loads on the track frames imposed thereon by bulldozer blades or similar implements mounted thereon, each bearing most frequently consists of a pin and bushing connection disposed at the rearward extremity of a diagonal brace which extends inwardly and rearwardly from the track frame associated therewith. To resist the lateral loads imposed by the implement (compounded frequently by the side hill operation of the tractor), the track frames have heretofore been relatively complex and expensive in the area of these inner bearings. Because of these added track frame diagonal braces, other machine features such as ground clearance and the size of the tractor cross-drive housing are detrimentally affected. Further, even with the laterally spaced bearings positioned for maximum resistance to the load, it is not unusual for the bearings to fail, requiring larger and the more expensive configurations to be adopted.

Another problem with tractors equipped with bulldozer blades is that the push arms and blade thereof form a U-shaped structure which in itself is relatively weak in its ability to withstand side loads. Diagonal braces have heretofore been added between the inside forward portions of the push arms and the central rear part of the blade to stiffen the bulldozer structure. In turn, this has required that the blade be positioned farther forward to provide the necessary clearance with the forward ends of the tracks as the blade is raised and lowered during operation, which adversely affects the overall length of the machine, its balance, and the ability of the blade to smoothly cut the earth. Such diagonal brace problems are set forth in Application Ser. No. 176,916, filed Sept. 1, 1971, as well as U.S. Pat. Nos. 3,025,620 and 3,049,820, all assigned to the assignee of this application. The last-mentioned patents also point out the complexity of transmitting lateral loads through the diagonal brace joints while also allowing sufficient flexibility to permit tilting of the blade which tends to foreshorten and stretch various elements on the bulldozer assembly. This complexity requires much more sophistication in the design of joints, with accompanying additional expense.

Of more general interest in this area U.S. Pat. No. 1,379,323 to Turnbull, U.S. Pat. No. 1,450,465 to Turnbull, U.S. Pat. No. 2,786,724 to Armington et al, U.S. Pat. No. 2,863,516 to Peterson, U.S. Pat. No. 2,936,841 to Mazzarins, and U.S. Pat. No. 3,576,226 to Copeland (assigned to the assignee of this application), all the which teach frame suspension systems, but without incorporating a bulldozer or other implement.

SUMMARY OF THE INVENTION

It is an object of this invention to provide in a tractor having a pair of track frames and an implement mounted thereon, a system of suspension and bracing which provides for positive transfer of lateral loads on the implement to and through the main frame of the tractor.

It is a further object of this invention to provide a system, which, while fulfilling the above object, provides proper suspension movement of the track frames, meanwhile insuring proper alignment thereof.

It is a still further object of this invention to provide a system which, while fulfilling the above objects, is simple in design and economical in construction, meanwhile being effective in operation.

Broadly stated, the invention comprises a vehicle having a main frame, and first and second track frames disposed on either side of the main frame, each pivotally associated with the main frame about an axis transverse of the vehicle. Further included is a bulldozer comprising first and second forwardly extending push arms pivotally mounted on either side of the vehicle, and a bulldozer blade attached to the forward ends of push arms forwardly of the vehicle. Bracing means interconnect the main frame and the bulldozer for resisting relative lateral movement therebetween. Further included is an equalizer bar disposed transversely of the vehicle and having first and second extending ends. Means are included for pivotally coupling the equalizer bar to the main frame about a longitudinal vehicle axis and between the first and second extending ends thereof. Means are further included for pivotally coupling the first and second extending ends to the first and second track frames, so that at least some of the lateral load on the blade is transferred to the main frame, to the equalizer bar, and to the track frames, with the equalizer bar meanwhile maintaining said track frames in positive spaced relation during the pivoting of said track frames.

BRIEF DESCRIPTION OF THE DRAWINGS

These and other objects of the invention will become apparent from a study of the following specification and drawings, in which.

DESCRIPTION OF THE PREFERRED EMBODIMENT

Figure 1:
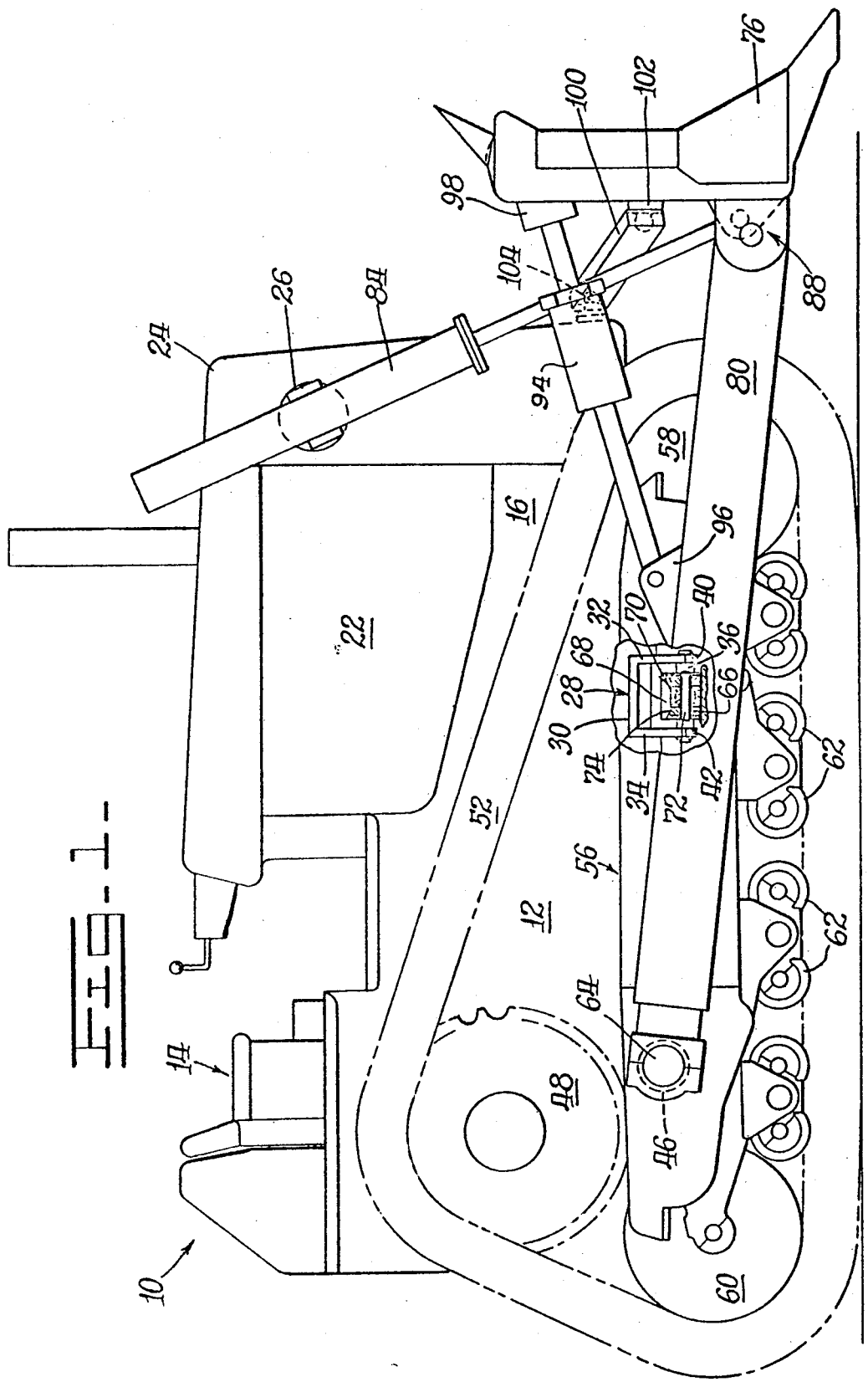
FIG. 1 is a side elevation, partially broken away, of a tractor incorporating the invention.
Figure 2:
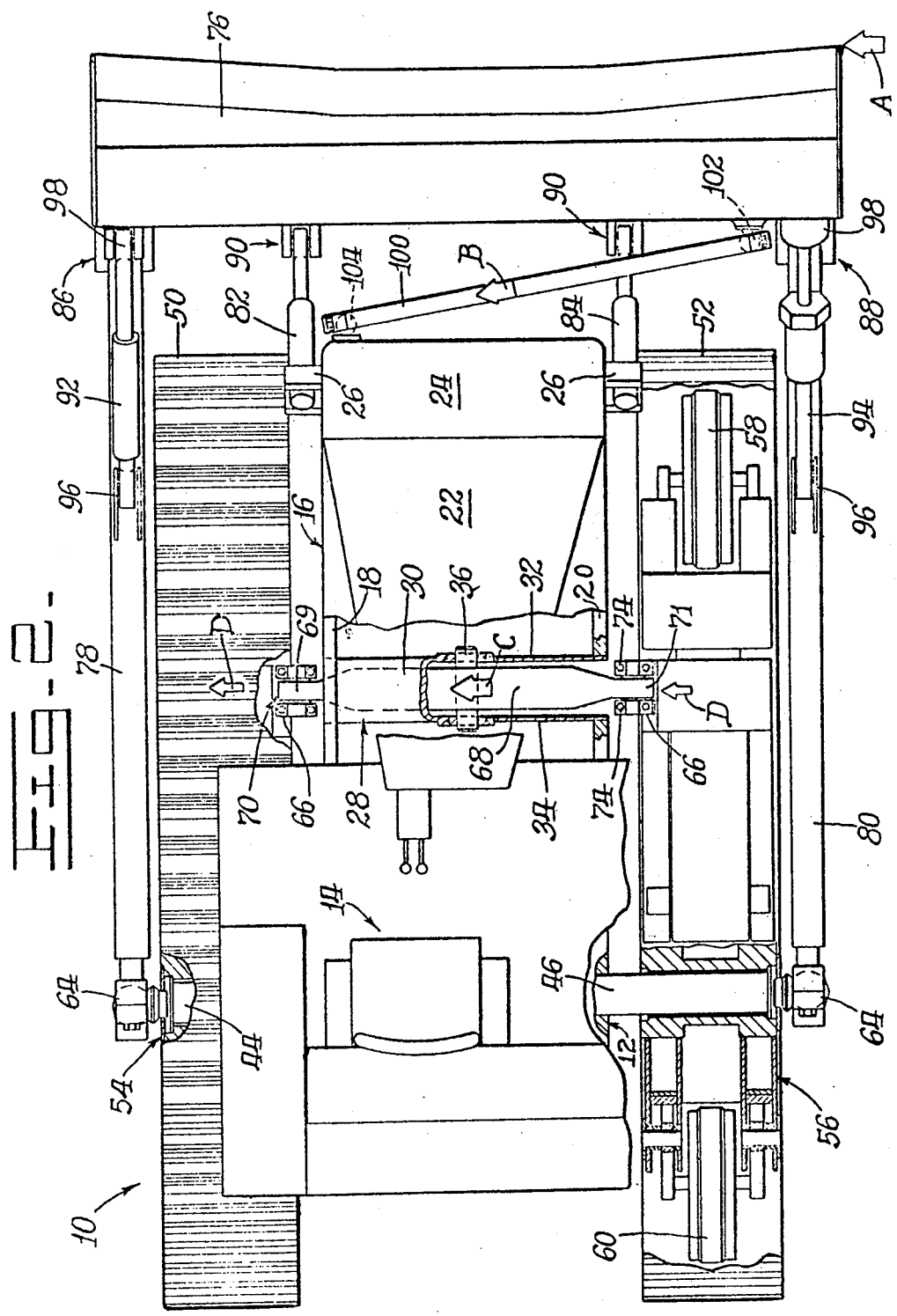
FIG. 2 is a plan view, partially broken away and in section, of the tractor of FIG. 1.
Figure 3:
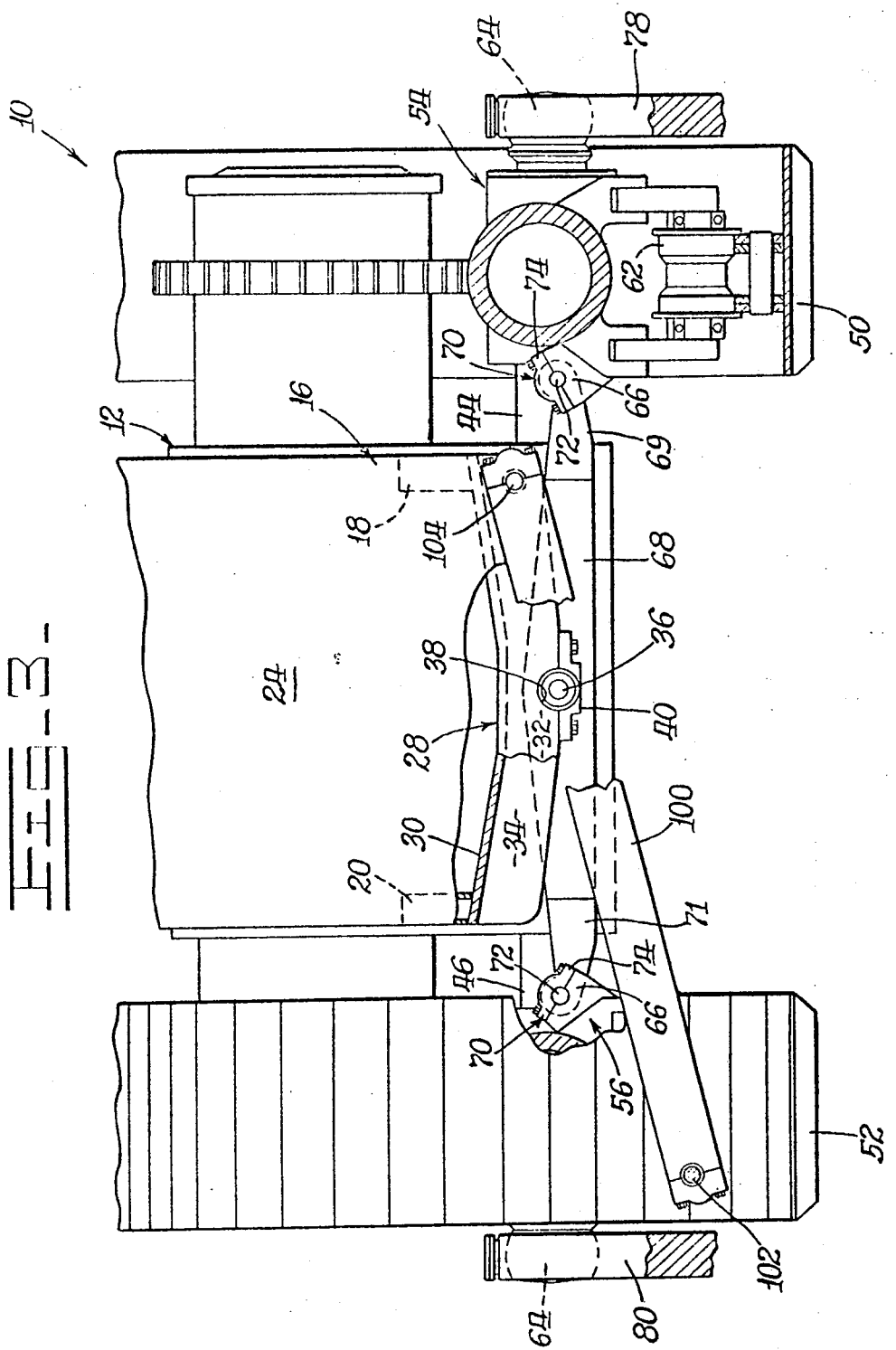
FIG. 3 is a partial front elevation, partially broken away and in section, of the tractor of FIGS. 1 and 2.

Referring to FIGS. 1, 2, and 3, a track-type tractor 10 includes a rear box-like power train housing 12 with an operator station 14 disposed thereabove. A tractor main frame shown generally at 16 is integrally secured to the forward portion of the power train housing 12 and consists of a pair of forwardly extending, generally parallel side beams 18 and 20 which support a conventional engine housing 22. The front ends of the side beams 18, 20 are tied together by a relatively strong upwardly extending open box cross frame 24 which conventionally contains within it a heat exchanger system (not shown) for the tractor 10. Further, a pair of trunnion type implement mounting universal joints 26 are individually disposed on either side of the open box cross frame 24.

The tractor main frame 16 includes a transversely disposed equalizer bar receiving saddle shown generally at 28 intermediate the length of the side beams 18 and 20 with a substantially horizontal concave top plate 30 and vertically depending front and rear plates 32 and 34 forming an inverted U-shaped trough. A longitudinal oriented pivot pin 36 is removably secured in a plurality of semi-circular recesses 38 in the plates 32 and 34, and similar complementary recesses in a pair of retaining caps 40 and 42, as shown also in FIG. 3.

As shown in FIGS. 1, 2, and 3, rearwardly of the saddle 28, a pair of track roller frame pivot pins 44 and 46 are supported by the power train housing 12 and extend outwardly therefrom. Similarly, a pair of track-driving sprockets 48 (one shown) are rotatably supported by the housing 12 on either side thereof, in driving engagement with a pair of continuous track chain assemblies 50 and 52. These track chain assemblies 50 and 52 generally circumvent a pair of generally parallel forwardly extending track roller frames 54 and 56 disposed on either side of the main frame 16 and pivotally mounted on the pivot pins 44 and 46 respectively, so as to pivot about axes transverse of the tractor 10. Roller frames 54,56 individually include an idler wheel 58 at the front, a similar idler wheel 60 at the rear, and a plurality of track rollers 62 in guiding relation to the track chain assemblies. The idler wheels 58,60 and track rollers 62 are preferably individually pivotally mounted in a resilient manner. Each of the track roller frames 54 and 56 support an outwardly extending push arm mounting ball joint 64 in generally aligned relation with the transverse axis of pivot pins 44 and 46, and an inner upwardly extending pin mounting bracket 66 in transverse aligned relation with the saddle 28.

The tractor main frame 16 and its associated upper structure is supported by track roller frames 54 and 56 through a lateral load-transmitting equalizer bar 68. The equalizer bar 68 is disposed transversely of the tractor 10 and is centrally pivotally mounted on the pin 36 for oscillation in a generally vertical plane within the saddle 28. The outer ends 69,71 of the equalizer bar 68 are adapted to receive ball joints shown generally at 70 in associated working relation to the longitudinally oriented pins 72 supported in the brackets 66 as best shown in FIG. 1. Each bracket 66 has a retaining cap 74 removably secured thereto to hold the pins 72 associated therewith.

As best shown in FIG. 2, an earthmoving bulldozer 76 is carried forwardly on the tractor 10 by a pair of generally parallel push arms 78 and 80 and by a pair of extendible lifting jacks 82 and 84. The push arms are preferably mounted to the rear of the blade 76 by self-aligning joints shown generally at 86 and 88, which may be of the ball or clevis types, and are pivotally mounted to the ball joints 64 at the rear of the tractor 10 on either side of the main frame 16. The push arm 78 is pivotable about the same axis as the track frame 54, and the push arm 80 is pivotable about the same axis as the track frame 56. The lifting jacks 82 and 84 are universally supported in the joints 26 and have their forward lower extremities also connected to the rear of the blade 76 by a pair of ball joints 90. The blade 76 is held in a generally erect position by a pair of tilt braces 92 and 94 connected as by pivot pins and brackets 96 to the arms 78, 80 and by ball and socket joints 98 to the upper rear portion of the blade 76. The left tilt brace 92 is shown as being of the manually extendible form, while the right tilt brace 94 is of the hydraulically extendible cylinder form.

A single rigid stabilizing link 100 is pivotally coupled to the blade 76 by means of a ball joint 102, and is pivotally coupled to the forward portion of the main frame 10, i.e., cross frame 24, by means of a ball joint 104. The link 100 is disposed generally transversely of the tractor 10, and extends from the link-main frame pivot on one side thereof (i.e., ball joint 104) across the main frame 16 and to the link-blade pivot (i.e., ball joint 102).

Figure 4:
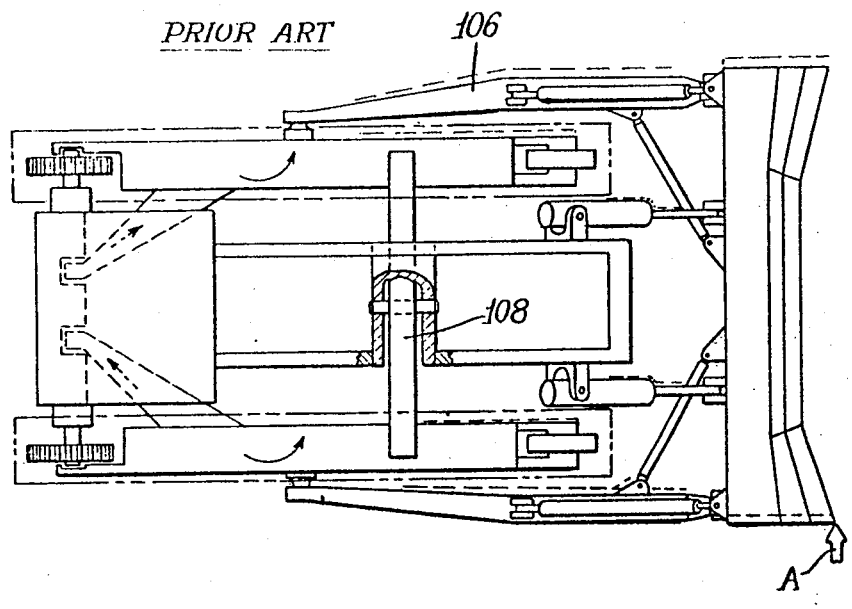
FIG. 4 is a plan view, partially broken away, of a prior art form of tractor; and, FIG. 5 is a view similar to that of FIG. 3 of the tractor incorporating the invention, for comparison with the prior art tractor.
Figure 5:
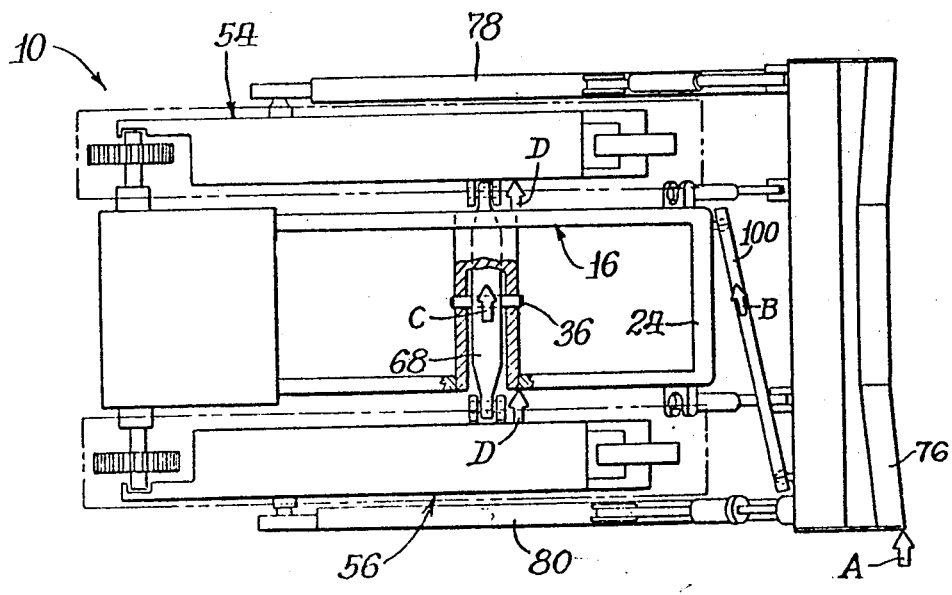

In the operation of the invention, the advantages thereof become apparent when the blade 76 is subjected to side loading as shown by the load indicating arrow A, FIGS. 2 and 5, as compared to subjecting the prior art system of FIG. 4 to the same lateral load. In the case of the prior art system, the U-shaped bulldozer frame 106 will be distorted as shown by the broken lines. In the present inventive system, the lateral load is substantially directly transmitted by the stabilizer link 100 as per load indicating arrow B to the tractor main frame 16 through the cross frame 24. A significant portion of the side loading is then directed through the side beams 18 and 20, the saddle 28, and pin 36 to the lateral load transferring equalizer bar 68 as shown by arrow C. In turn, the load is passed on through the ball joints 70 at the ends of the equalizer bar 68 to the track frames 54 and 56 as shown at D.

It should be noted that the equalizer bar-main frame pivot axis, the end 69-track frame pivot axis, and the end 71-track frame pivot axis lie in substantially the same plane. Because of this, the equalizer bars 68 maintain the track frames 54,56 in substantially parallel alignment. Again, this is in contrast to the prior art track roller frames shown in FIG. 4 which are free to rotate in the counterclockwise manner shown independently of each other within the clearances of their laterally spaced rear bearings because the equalizer bar 108 thereof, of conventional design, transmits only the vertical weight of the tractor main frame and substantially minimal side loading.

As shown in FIG. 3, the relatively long length of the stabilizing link 100 with joint 104 to the rightward extremity of the cross frame 24 and with joint 102 to the left, but still within the outer edge of the track 52, imparts minimal sidewise motion to the blade 76 as the blade 76 is raised or lowered by the lifting jacks 82 and 84. Further, push arms 78 and 80 of the bulldozer blade 76 are long, being mounted relatively far to the rear, so that the angle of movement of the arms 78,80 is relatively small as they are raised or lowered. Still further, as stated above, the three point pinned equalizer bar 68 is constructed so that the pivotal axes of the longitudinally disposed central pin 36 and the outer end ball joints 70 are substantially in the same horizontal plane in order to minimize the effect of arcuate movement of the equalizer bar 68 as the vehicle 10 traverses over uneven terrain, with its tendency to thereby pull the track roller frames 54 and 56 together out of a true parallel condition.

It should be appreciated that the stabilizer link 100 can also be removably secured to the right push arm 80, for example, without departing from the spirit of the invention. Also, the ball joints 104 and 102 thereof, as well as the equalizer bar 68 central pin 36 and outer joints 70, can be constructed to have a limited and controlled yielding as by constructing them with high load carrying capacity resilient elastomer bushing elements or the like.

What is claimed is:

1. A vehicle comprising:

a main frame;

first and second track frames disposed on either side of the main frame, each pivotally associated with the main frame about an axis transverse of the vehicle;

a bulldozer assembly comprising first and second forwardly extending push arms pivotally mounted on either side of the vehicle, and a bulldozer blade attached to the forward ends of the push arms forwardly of the vehicle;

bracing means interconnecting said main frame and said bulldozer assembly for resisting relative lateral movement therebetween;

an equalizer bar disposed transversely of the vehicle and having first and second extending ends;

means for pivotally coupling the equalizer bar to the main frame about a longitudinal vehicle axis and between the first and second extending ends thereof; and, means for pivotally coupling the first and second extending ends to the first and second track frames, so that at least some of a lateral load on the blade is transferred by the bracing means to the main frame, to the equalizer bar, and to the track frames, with the equalizer bar meanwhile maintaining said track frames in positive spaced relation during the pivoting of said track frames.

2. The vehicle of claim 1 wherein the equalizer bar-main frame pivot axis, the first extended end-first track frame pivot axis, and a second extended end-second track frame pivot axis lie in substantially the same plane.

3. The vehicle of claim 2 wherein said bracing means comprise a single rigid link pivotally coupled to the forward portion of the main frame and the bulldozer assembly.

4. The vehicle of claim 3 wherein the link is disposed generally transversely of the vehicle.

5. The vehicle of claim 4 wherein the first and second push arms are pivotally mounted to the track frames at the rear of the vehicle, and wherein the link extends from the link-main frame pivot on one side thereof across the main frame and to the link-bulldozer assembly pivot.

6. The vehicle of claim 5 wherein the link is pivotally coupled to the blade of the bulldozer assembly.

7. The vehicle of claim 6 wherein the means for pivotally coupling the equalizer bar to the main frame comprise a pin fixed to the main frame and on which said equalizer bar is pivotally mounted, and wherein the means for pivotally coupling the first and second extending ends to the first and second track frames comprise first and second ball-and-socket means respectively.

8. The vehicle of claim 7 wherein the first push arm and the first track frame are pivotable about the same axis, and wherein the second push arm and second track frame are pivotable about the same axis.

* * * * *